United States Patent [19]
Kimball et al.

[11] Patent Number: 5,150,246
[45] Date of Patent: Sep. 22, 1992

[54] ADMINISTRATION ARRANGEMENT FOR LOCAL AREA NETWORK ARCHITECTURE

[75] Inventors: Robert M. Kimball, Brick, N.J.; Thomas F. McIntosh, Dunwoody, Ga.

[73] Assignee: AT&T Bell Laboratories, Murray Hill, N.J.

[21] Appl. No.: 401,354

[22] Filed: Aug. 31, 1989

[51] Int. Cl.$^5$ .............................................. H04B 10/20
[52] U.S. Cl. ................................. 359/118; 359/119
[58] Field of Search ............... 455/600, 606, 607, 612, 455/617; 370/1, 3, 4; 359/18, 119

[56] References Cited

U.S. PATENT DOCUMENTS

| | | | |
|---|---|---|---|
| 4,539,679 | 9/1985 | Bux | 370/85.14 |
| 4,715,032 | 12/1987 | Nilsson | 370/85.15 |
| 4,731,784 | 3/1988 | Keller | 370/4 |
| 4,763,315 | 8/1988 | Nakayashiki et al. | 370/16 |
| 4,766,590 | 8/1988 | Hamada | 370/85.15 |
| 4,866,704 | 9/1989 | Bergman | 370/85.5 |
| 4,884,192 | 11/1989 | Terada | 370/85.15 |

FOREIGN PATENT DOCUMENTS

| | | | |
|---|---|---|---|
| 0061237 | 4/1984 | Japan | 455/600 |
| 0172840 | 9/1985 | Japan | 455/600 |
| 0015444 | 1/1986 | Japan | 455/600 |
| 0030823 | 2/1986 | Japan | 455/600 |
| 0058342 | 3/1986 | Japan | 455/600 |
| 0221237 | 9/1987 | Japan | 455/600 |
| WO8502078 | 5/1985 | PCT Int'l Appl. | |

Primary Examiner—Edward L. Coles, Sr.
Assistant Examiner—L. Pascal
Attorney, Agent, or Firm—Edward W. Somers

[57] ABSTRACT

A network ring topology includes a plurality of entry and exit interfaces (100,110) disposed in administrative locations such as in an equipment room (53) and in riser and satellite closets (51, 57), and at stations. Interconnections between ports of sets of ports of the interfaces are made in the closets by jumpers (120—120) and either in a direct or in an inverted manner, the direct being between corresponding ports of corresponding sets of ports in interfaces. Inverted connections are made between two exit or between two entry interfaces in which input and output ports of corresponding rings are connected by jumpers. The interfaces are color coded and may be either entry or exit type to denote the arrangement of the ports. The interfaces and the color coding arrangement allow a craftperson to make connections in an administrative location without having to follow signals through the ring. For a dual ring counter rotating network, each interface necessarily include two sets of ports.

50 Claims, 11 Drawing Sheets

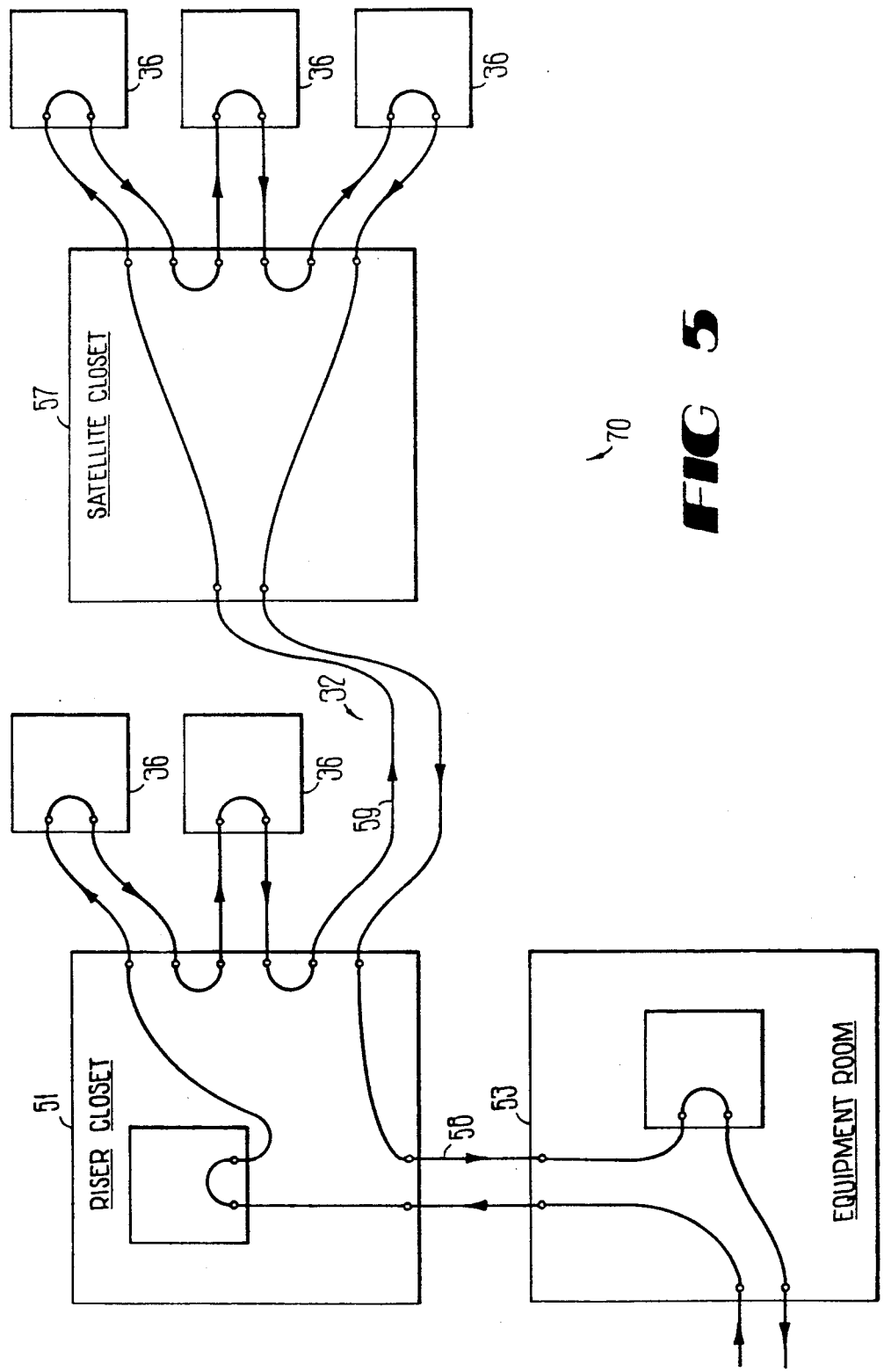

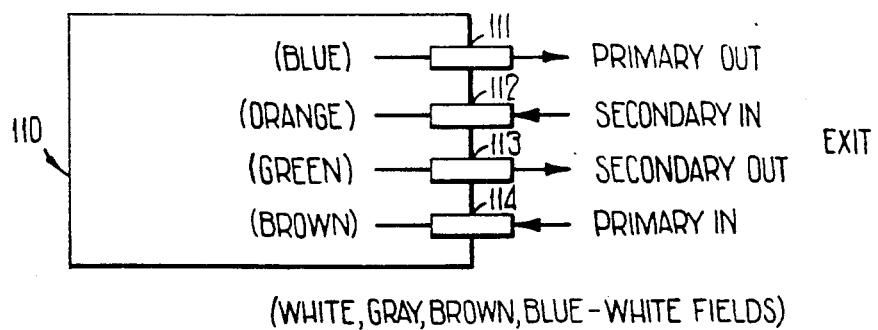
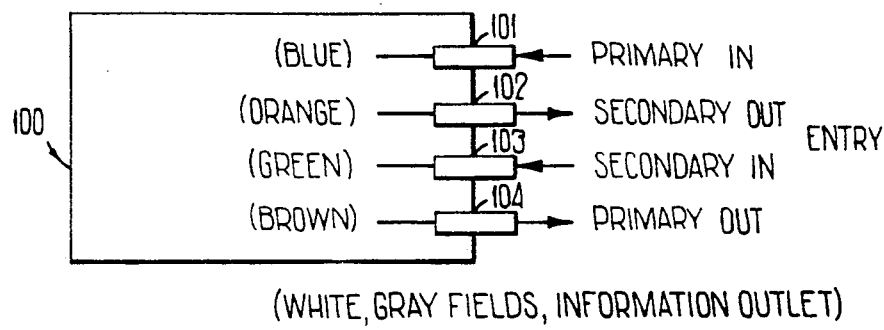
FIG 6
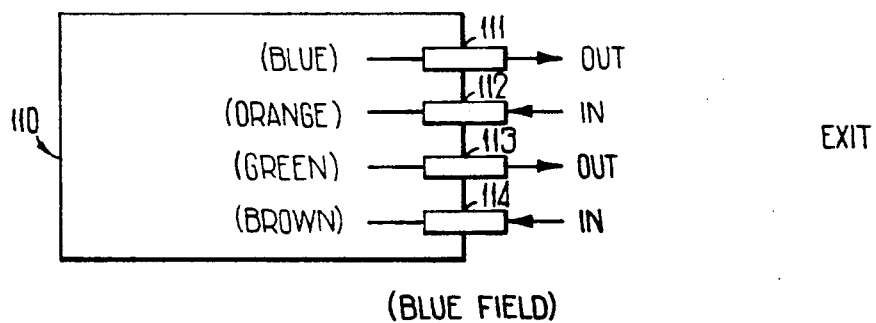
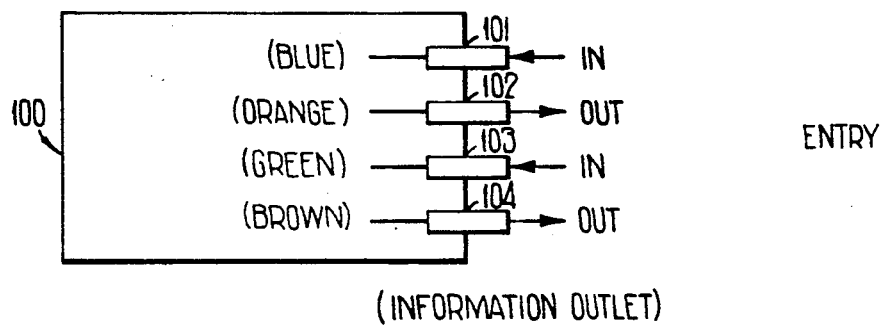
FIG 7

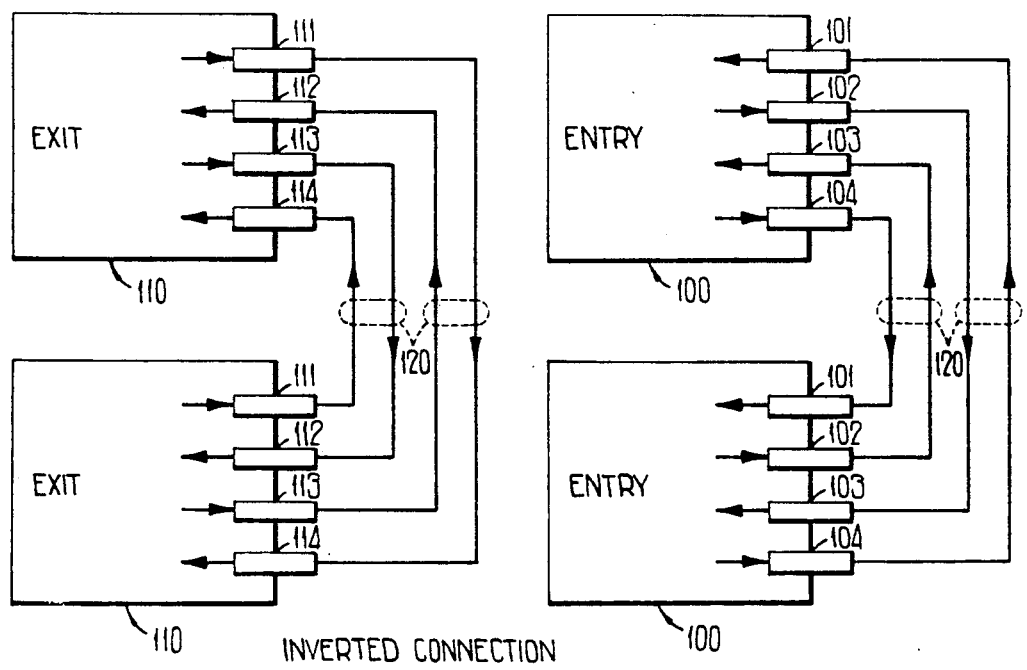
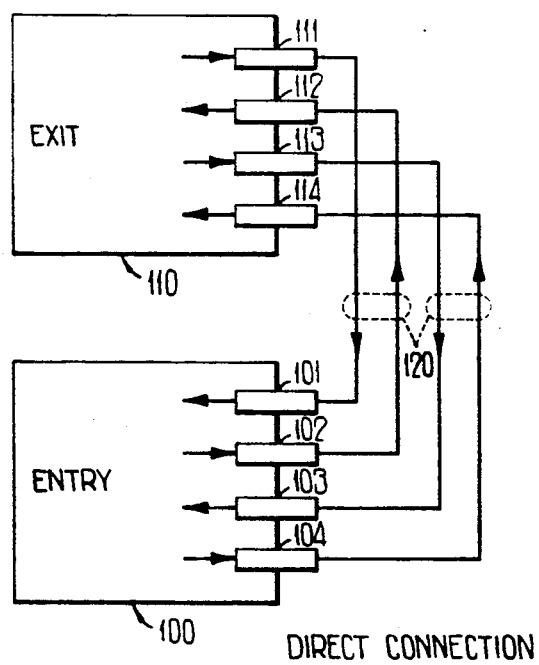
FIG 8

ADMINISTRATION ARRANGEMENT FOR LOCAL AREA NETWORK ARCHITECTURE

TECHNICAL FIELD

This invention relates to an arrangement for administering a architecture for a local area network (LAN). More particularly, the invention relates to single ring and to counter rotating dual ring network topologies and to methods of adminstering same.

BACKGROUND OF THE INVENTION

The data communications industry has established the fiber distributed data interface (FDDI) as a standard for the definition of the properties of a local area network. A system in accordance with that standard is referred to as an FDDI system and is an optical system port to port operating at a data line rate of 125 megabits per second.

FDDI is the first, all optical fiber high speed local area network system and will become prominent in the last decade of the twentieth century. It will provide a high speed optical transmission path between mainframe and peripheral equipment and is suitable for use as a backbone network between lower speed local area networks. FDDI presently is a 100 megabit LAN transfer rate system that recommends a 62.5/125 micron core/cladding diameter optical fiber and is an LED based standard involving dual, counter-rotating, token passing rings that operate at a center wavelength of 1300 nm.

Dual rings include a primary ring and a secondary ring. Dual rings are used to provide enhanced reliability and an option for higher performance. If both rings are operative, the capability of transmitting in both ring directions exists.

The large scale use of optical fiber for the local area network will result in an extensive use of optical fiber in building distribution systems. The FDDI system presents several challenges. There are restrictions imposed by FDDI standards and there are complications associated with large quantities of fiber that include fiber which extends to individual work stations. In order to aid network engineers and installers in enforcing basic rules and/or more restrictive policies which may be chosen by the user, the FDDI standard has defined certain requirements.

Details of a receptacle for a dual fiber connector are specified in a standard referred to as the Physical Layer Medium Dependent (PMD) part of the FDDI standard. The PMD determines the specifications for optical transmitters and receivers, optical fiber, optical connections and optical bypass switches along with optional keying configurations. The receptacle and an associated plug are polarized mechanically to prevent the transposition of transmit/receive fibers, and keys corresponding to station interfaces are designed to avoid mixing primary and secondary rings and to avoid mixing station attachments. Viewing a station with the key on top, the transmit signal always exits the interface on a left fiber port, and the receive signal always enters the interface on a right fiber port.

A simple dual ring architecture can be arranged with the keying and signal directions defined in the PMD standard by using duplex jumper cables. The primary ring is constructed by connecting a B receptacle of each station to an A receptacle of the next station in a forward direction around the primary ring. When the primary ring is closed, the secondary ring is completed with the secondary ring signal flowing in an opposite direction.

Networks may be as simple as one which includes a station interconnecting within a common data center connected to an equipment room, as common as one which includes stations which connect within a single multi-floor building or as complicated as one which interconnects a campus involving several buildings. As long as the rings are confined to a relatively small area such as a data center, for example, a simple fiber topology which includes duplex jumpers that interconnect the network nodes is relatively easy to install and administer.

The prior art includes such a simple fiber topology for a single floor on which are disposed a plurality of stations. For a dual ring, counter rotating topology, each station includes two sets of ports each set associated with a receptacle. One port of one set (B receptacle) is an output port for the primary ring and the other port, an input port for the secondary ring. The other set of ports (A receptacle) for each station includes an output port for the secondary ring and an input port for the primary ring. Jumpers connect the primary output port of each station to the primary input port of a next successive station until a primary ring has been completed through all the stations. Likewise, the secondary ring is completed by connecting the secondary output port of each station in an opposite ring direction to the secondary input port of an adjacent station.

As the network expands to multiple floors of a single building or to a campus including multiple buildings, connections become prohibitively complex to administer. For such expanded networks, it should be clear that a manageable distribution system is necessary. Desirably, the sought-after system should be one which includes simplistic rules for installation and administration.

What is needed is a strategy for implementing a network in a mechanistic way without having to understand the architecture. Without the sought-after system, a craftsperson would have to trace an optical signal through the network for every fiber path which is prohibitively difficult and time consuming. Also, without such a system, repairs would require higher skill levels.

SUMMARY OF THE INVENTION

The foregoing problems of the prior art have been overcome by the local area network architecture of this invention. A ring network topology comprises at least two stations and at least one administrative location. An optical path extends from the at least one administrative location to a first one of the stations and returns from the one station to the administrative location. An optically path also extends from the at least one administrative location to a second one of the stations and returns from the second one of the stations to the administrative location. Interface means are disposed at the administrative location for terminating the optical path to the first one of the stations and for terminating the optical path to the second one of the stations. Disposed at the administrative location are jumpers for providing a ring by completing the optical path from the first one of the stations through the administrative location to the second one of the stations.

A dual ring network topology in accordance with this invention comprises at least two stations and at least one administrative location. The topology also includes a first optical path which extends in one ring direction from the at least one administrative location to a first one of the stations and which returns from the one station to the at least one administrative location, and which extends from the at least one administrative location to a second one of the stations and which returns from the second one of the stations to the one administrative location. A second optical path extends in an opposite ring direction from the at least one administrative location to the first one of the stations and returns to the administrative location, and extends from the at least one administrative location to the second one of the stations and returns to the administrative location. Also included are interface means disposed at the administrative location for terminating each portion of the first optical path and for terminating each portion of the second optical path. Jumper means disposed in the administrative location are used to provide a first ring by completing the first optical path through the administrative location and to provide a second ring by completing the second optical path through the administrative location.

In general, a network architecture characterized by a logical ring topology provides optical signals to $\eta$ stations, where $\eta$ is an integer having a value of at least two. Each of the stations is capable of transmitting and receiving optical signals. Also included is a first interface which includes two sets of optical fiber connection ports, one of the ports of each set being a transmit or an output port and the other one of the ports of each set being a receive or input port. Also provided is at least one second interface each of which is associated with a station and each of which includes two sets of optical fiber connection ports, one of the ports of each set of each said second interface being a transmit or output port and the other one of the ports of each set of each said second interface being a receive or an input port. Optical media connects a station to the first interface and each of the second interfaces to an associated station. Jumper means connect the first and second interfaces to cause the stations and the interfaces to be connected in a single or in a dual ring topology.

BRIEF DESCRIPTION OF THE DRAWING

Other features of the present invention will be more readily understood from the following detailed description of specific embodiments thereof when read in conjunction with the accompanying drawings, in which:

FIG. 5 depicts one ring of a logical dual ring topology for a building in accordance with the principles of this invention;

FIG. 6 is a schematic view of exit and entry interfaces of the dual ring network topology of this invention;

FIG. 7 is a schematic view of exit and entry interfaces included in a single ring topology;

FIG. 8 is a schematic view showing inverted and direct connections between interfaces;

DETAILED DESCRIPTION

Figure 1:
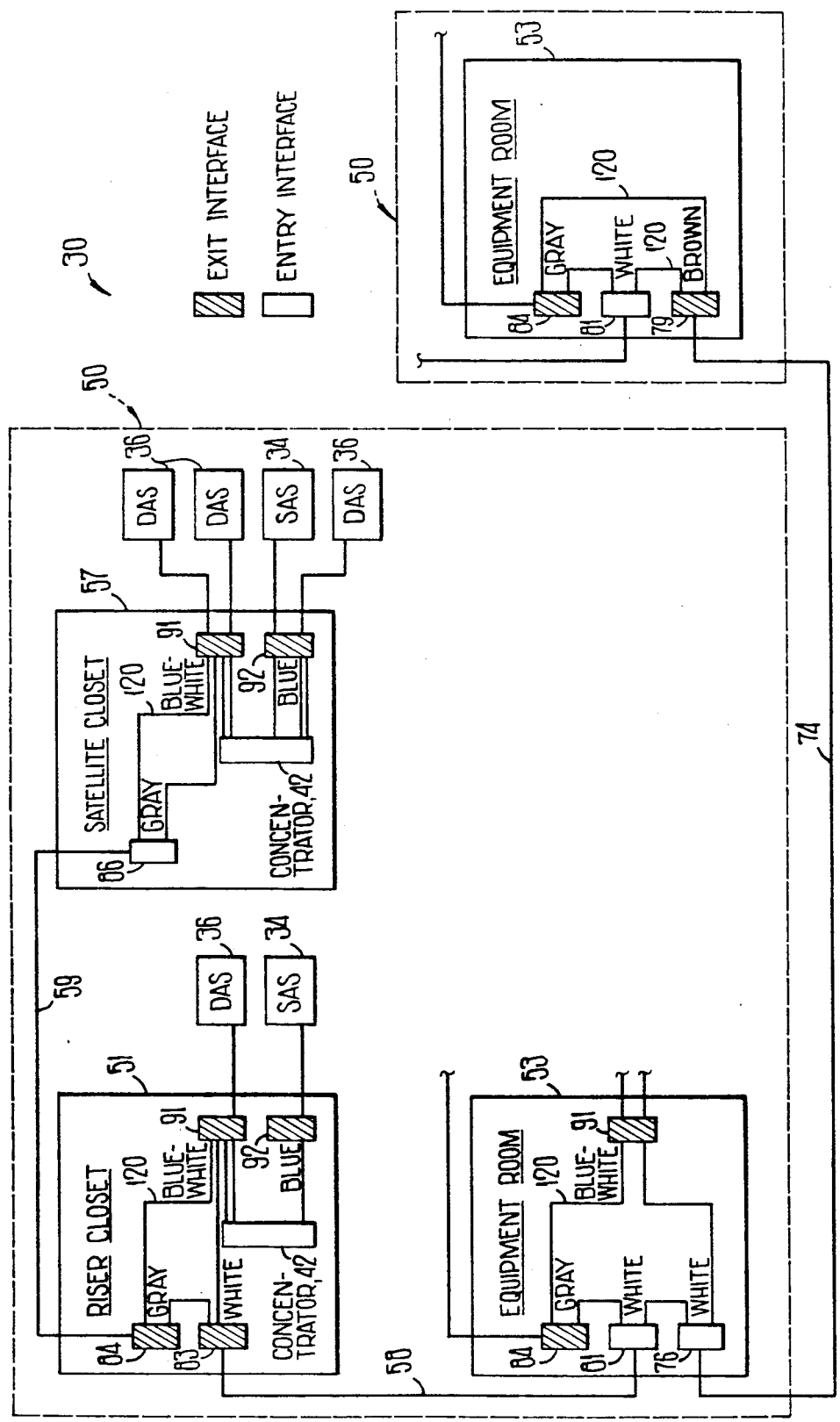
FIG. 1 is a schematic view of a network topology of a dual ring architecture of this invention.

Referring now to FIG. 1, there is shown a local area network architecture of this invention which is designated generally by the numeral 30. An advantage of the architecture 30 is that it provides the ability to install and administer a complex optical fiber wiring plan without knowing the complexities of the network. Without the architecture of this invention, it would become necessary to trace an optical signal through the network for every fiber path which requires a high skill level. With the network architecture of this invention, a craftsperson can enter an administrative location and install jumpers in accordance with a relatively simple set of rules.

Figure 2:
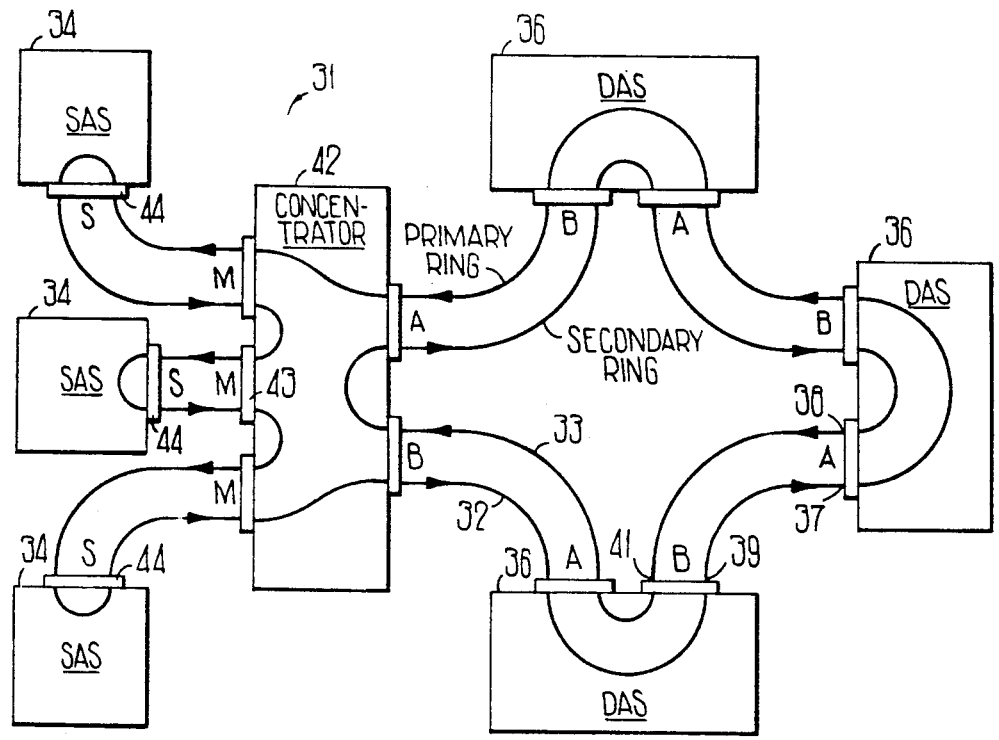
FIG. 2 is a schematic view of a prior art simple dual ring topology.

A prior art FDDI network 31 is depicted in FIG. 2. As can be seen in FIG. 2, the network architecture 31 includes a plurality of stations which are connected through dual counter rotating main rings. One of the rings is designated by the numeral 32 and is referred to as a primary ring, and the other designated by the numeral 33, a secondary ring. Each of the stations is capable of transmitting and receiving signals.

As can be seen in FIG. 2, the network architecture 31 may include both single attached stations (SAS) each of which is designated by a numeral 34 and dual attached stations (DAS) each of which is designated by the numeral 36.

A dual attached station 36 connects to both rings of a dual ring network. Each dual attached station has suitable electronics, i.e., optical transceivers, so that it can receive and repeat data on both rings. Also, each dual attached station has two defined optical connection pairs. One, called the A receptacle or port set, includes a primary ring input 37 and a secondary ring output 38. The second, called the B receptacle or port set, contains a primary ring output 39 and secondary ring input 41. Dual attached stations are highly reliable because the rings reconfigure themselves and continue to operate if one of the optical transceivers fails or is disconnected, or if one of the physical links to the station fails.

A single attached station has only a single optical transceiver and can be connected to only one ring by a device referred to as a concentrator 42. Concentrators are stations which provide additional sets of ports, which are also referred to as port sets or connection pairs, for attachment of single attached stations 34—34 to the network 31. Single ring port sets 43—43 on the station side of the concentrator are called master or M port sets and port sets 44—44 of the single attached station are called slave or S port sets. Dual attached stations also can be connected to concentrator port sets 43—43. Concentrators themselves may be dual attached stations connected to a dual ring, or single attached stations connected to another concentrator.

A concentrator receives data from both of the main rings and forwards data from one of the rings at 100 Mbps to each of the connected M port sets sequentially. After the data has been received from the last M port set, it is forwarded back out onto the main ring. Stations connected to concentrator M port sets are part of the FDDI token ring network. They receive data at 100 Mbps, transmit data at 100 Mbps, and capture and release tokens just as does any station on the main ring. However, stations connected to concentrator M port sets can only participate in the data communication over one of the two main rings.

As mentioned earlier, such a topology as that shown in FIG. 2 is suitable for single station layouts perhaps on a single floor. However, with stations dispersed on multiple floors and/or in different buildings, such a system is unmanageable.

The network topology for a generic distribution system for a building 50 (see FIG. 3) in accordance with this invention is a distributed star, with stations connected radially to administrative locations such as closets 51—51 associated with a riser 52 which are in turn connected to a centralized equipment room 53, another administrative location. The star network topology has many advantages such as ease of installation, flexibility for rearrangements and simplified administration, and consistency with evolving Electronic Industries Association (EIA) standards for commercial building wiring.

Figure 3:
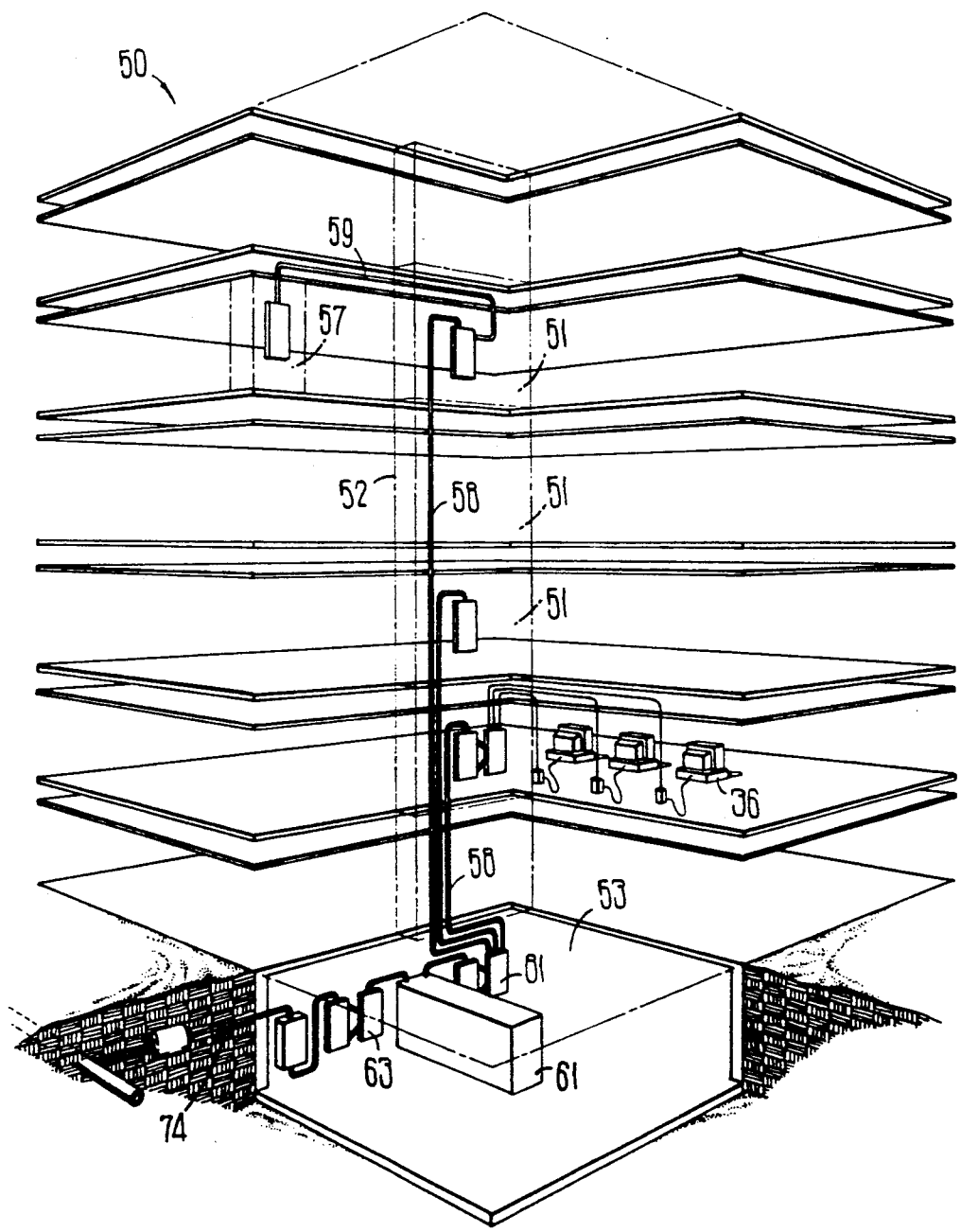
FIG. 3 is a schematic view of a building communications distribution system in accordance with this invention.

FIG. 3 shows a simplified building layout for the foregoing described topology. Workstations or stations, as they will be referred to hereinafter, may be either dual attached or single attached stations 36—36 or 34—34, respectively (see also FIG. 1). They are connected radially through a horizontal distribution system to the riser closets 51—51 located near a building riser 52 or a backbone system, or to satellite closets 57—57, which also are administrative locations and which in turn extend along cables 59—59 to the riser closets. The riser or backbone may in fact also be horizontal for large single floor applications which are typical in manufacturing facilities. Riser cables 58—58 connect floors to the equipment room 53.

Figure 4:
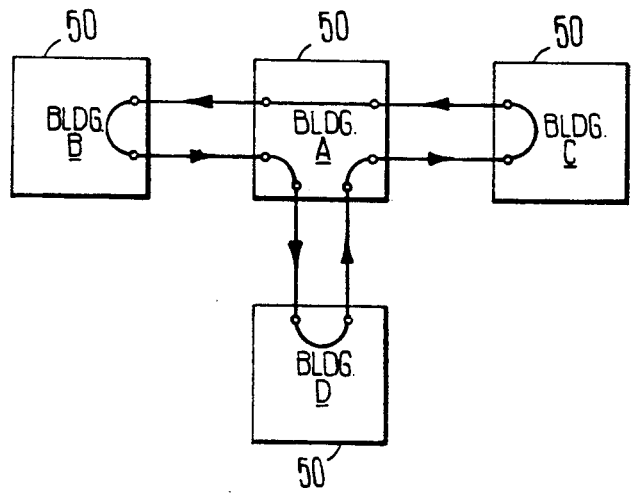
FIG. 4 is a schematic view of a logical ring topology for a campus environment.

The equipment room 53 may contain switching equipment, host computers, LANs or other electronics 61, and may include an interface 63 to a public network or to other buildings 50—50 in a campus environment (see FIG. 4). Campus is a term used to refer to a plurality of buildings which are connected together to provide data transmission paths. The layout of a campus frequently takes on a star topology with one building designated as the centralized location.

Although these distribution systems normally are multimedia employing both copper and fiber cables in the horizontal, riser and campus segments, FDDI requires an all fiber network which may be integrated into the generic multimedia distribution system. The FDDI dual ring architecture may be caused to overlay the physical star topology by using suitable design and administration guidelines in the closets and in the equipment room.

FIG. 5 shows a logical ring implementation including segments of a distribution system 70 in one building 50, and indicates the ring attachment to a campus network. In the description of the dual ring architecture, it is convenient to describe the primary ring 32. Because the primary ring 32 and the secondary ring 33 physically track each other through a network, the architecture of the secondary ring follows from the architecture of the primary ring. The primary ring is closed through each station 36, and the ring is constructed by suitable fiber cross-connection configurations in the administrative locations in the riser and satellite closets 51 and 57, respectively, and in the equipment room 53. For simplicity, neither the secondary ring nor information outlets that provide the interface to the horizontal cables at the point of station attachment are shown in FIG. 5. It should be observed that station attachments in the closets are easily included in the logical ring topology.

The logical ring topology for a more complex riser system connecting multiple floors is constructed in a star topology with the equipment room at the center. The cabling in the riser may involve individual cables to each riser closet, or larger cross-sectional cables that are tapered in the riser system. In either case, the star arrangement has significant advantages from the standpoints of administration and system reliability, compared to a daisy-chain configuration linking multiple floors on a single cable.

A similar logical ring topology for a campus including more than one building can be constructed (see FIGS. 1 and 4). Attachments to the ring are made in the equipment room of each building. The outside plant cable physical layout does not have to follow any particular topology, such as a physical ring, so that any random building layout can be accommodated. All that is required for a building to become attached to the logical ring topology is a four-fiber attachment to any other building already on the ring. The star building topology characteristic of some existing installations is readily accommodated.

As FDDI networks grow in size and complexity, large fiber distribution systems will be needed. The dual ring topology complicates network construction and administration because the exact configuration for cross-connections is dependent on the direction of the optical signal flow at the cross-connections, which is different depending on the administrative location in the network, i.e., riser closet 51, satellite closet 57, or equipment room 53 (see FIG. 1).

To simplify the interconnection of stations and provide consistent administration procedures, five color coded fields are defined for connections. Three of these fields are referred to as distribution fields because they are used to distribute or transport the dual ring to other locations. The other two fields are called station fields because they provide points of attachment of stations to the network.

The distribution fields in the building of FIG. 3, as well as in other buildings, are identified by colored labels, and are defined in the following manner. Campus cables 74—74 that transport the dual rings to one or more other buildings 50—50 are terminated in a white field 81 in the equipment room 53 of a building 50 of FIG. 1. A brown field 79 provides termination and access to fibers that bring the FDDI ring into another building 50. A campus cable 74 will always originate in a white field 76 and terminate in a brown field 79. Riser cables 58—58 which run between equipment rooms 53—53 and riser closets 51—51 are terminated at both ends in white fields, a white field 81 in the equipment room and a white field 83 in the riser closet 51. Cables terminated in gray fields 84—84 in riser closets 51—51 extend along the cables 59—59 to gray fields 86—86 in satellite closets 57—57.

There are two types of station fields, a blue-white field 91 and a blue field 92. A blue-white field 91 provides termination and access to the four fibers providing attachment of dual attached stations 36—36, including concentrators 42—42, to the dual ring topology. These attachments are generally located in closets or in an equipment room 53. The blue-white field 91 is used only when dual attached stations 36—36 are to be attached directly to the dual or main rings. Because of the importance of proper connection of these stations, that is, a misconnection may bring the rings down, no other station types may be connected in this field.

A blue field 92 provides termination and access to the fibers providing attachment of both dual and single attached stations 36—36 and 34—34, respectively, on the station side of a concentrator 42 (see FIG. 2). Blue fields 92—92, as well as blue-white fields, may appear in riser closets 51—51, satellite closets 57—57 or in an equipment room 53. Jumper connections in a blue field 92 always include a connection between a two fiber transmit and receive pair and an M port set 43 of a concentrator 42 (see FIG. 2). In addition, non-FDDI stations located in the horizontal and employing fiber interfaces also are terminated in the blue field 92. All station attachments that are not defined at the time of the initial installation, i.e., prewire situations, are terminated in a blue field 92.

For FDDI, there are differences between rings that employ concentrators 42—42 and those that do not. Stations not attached to a concentrator 42 have a much greater impact on the overall reliability of the rings than stations which are attached to a concentrator. In addition, stations attached to a concentrator 42 require a different cross connection configuration from stations attached directly to the dual ring topology. In view of these considerations, it is important to separate the two station types. To do this, two station fields were defined. As should be apparent from the discussion hereinbefore, a blue field terminates all stations attached to a concentrator 42, and all non-FDDI stations. The blue-white field terminates only those dual attached stations that connect directly to the main rings.

The field locations in a generic building architecture are shown in FIG. 1. It should be apparent that station and satellite closet attachments also may be made in an equipment room 53. Simple procedures have been developed to cross-connect between the different fields in the administrative locations to maintain the integrity of both dual ring and single ring attachments.

In addition to the color coded fields, interfaces, which are designated by numerals 100 and 110 (see FIG. 6) and which represent the fiber terminations for each station are provided. The type of interface which is defined, depending upon the location in the network, indicates the direction of optical signal flow at that point in the network.

Each interface includes four fiber ports which are generally referred to as the first, second, third, and fourth ports and which are arranged in two sets of two ports in each interface. One port of each set is a signal input port and the other, a signal output port. Further, each port has a color associated therewith in accordance with industry standards. The first port has a blue color associated therewith; the second, orange; the third, green; and the fourth brown.

Additional definitions regarding the interface are needed before cross connection configurations are described. To understand these definitions, it is important to recognize why they are needed. As a signal propagates from a transmitter to a receiver in a large building or in a campus distribution system, it may pass several system administrative locations such as riser closets, for example, where cross-connections are made. Depending on where the administrative location is disposed in the network, the signal either will be entering or exiting the network which determines how optical fibers which are used for cross connecting will be configured. Due to the duplex nature of fiber systems, the cross-connection used depends on the signal direction. Fields and interface definitions are used to simplify the administration of cross-connections in the administrative locations.

The FDDI PMD standard for an interface defines first, second, third and fourth fiber ports arranged in two sets of ports for connecting a dual attached station 36 to the fiber dual rings. Set A for attachments to the dual ring which includes an input port for the primary ring and an output port for the secondary ring (Primary In/Secondary Out or PI/SO) and set B, an input port for the secondary ring and an output port for the primary ring (Secondary In/Primary Out or SI/PO) form a four fiber dual attached station interface between the distribution system and a station. This defines a standard four-fiber dual attached station interface to the distribution system regardless of the particular distribution or cross-connect apparatus. For the interface 100, the primary ring 32 always is attached to a first fiber port 101 (blue) and a fourth fiber port 104 (brown) (see FIG. 6), and the secondary ring 33 always is attached to orange and green fiber ports 102 and 103, respectively. The interface fiber assignments are given in Table I with the fiber or port number corresponding to the last digit in the numeral used in this description to designate a fiber port.

TABLE I

| | Interface Fiber Assignment | |
|---|---|---|
| Fiber | Color | Ring |
| 1 | Blue | Primary |
| 2 | Orange | Secondary |
| 3 | Green | Secondary |
| 4 | Brown | Primary |

In making connections between the color-coded fibers of building cable and the inside of information outlets, fiber assignments conform to the standard interface.

This four-fiber interface to the fiber network for dual rings can take one of two forms as shown in FIG. 6. The definition of the interface is determined by the direction of signal flow for the primary ring in the first or blue fiber port position. An exit interface 110 corresponds to a primary signal out of the distribution system at a first fiber port 111, while an entry interface 100 represents a signal flow into the distribution system at the first fiber port 101. Designating the sense of the signal for the first fiber establishes the direction all other signals at the interface, as shown in FIG. 6. As mentioned earlier, the ports 101 and 104 of the entry interface 100 are used for the primary ring 32 whereas the ports 102 and 103 are used for the secondary ring 33. In the exit interface 110, the primary ring is connected through ports 111 and 114 and the secondary ring through ports 112 and 113.

As an example, referring to the system shown in FIG. 1, a primary ring signal flowing into the distribution system on an entry interface on a white field 81 in an equipment room 53 would exit the network from an exit interface in a white field 83 in a riser closet 51. The sense of the interface i.e., exit or entry, is changed between any two consecutive administrative locations.

Interfaces are provided at each administrative location in the network. For example, interfaces may be found in an equipment room 53, in a riser closet 51 and in a satellite closet 57. Table II defines the sense of each interface for each color field at each network location in the distribution system. The interface at an information outlet for a station attachment at the end of a horizontal distribution system will always have an entry interface 100.

TABLE II

Standard Distribution System Interfaces

| Location | White | Brown | Gray | Blue-White | Blue |
|---|---|---|---|---|---|
| Riser Closet | Exit | — | Exit | Exit | Exit |
| Satellite Closet | — | — | Entry | Exit | Exit |
| Equipment Room | Entry | Exit | Exit | Exit | Exit |

Exit and entry interfaces 110 and 100, respectively, also are appropriate in describing single ring attachments. Two single attached station attachments to four-fiber interfaces (see FIG. 7) are assigned to the first (blue) and second (orange) fiber ports 101 and 102 or 111 and 112, and to the third (green) and fourth (brown) fiber ports 103 and 104 or 113 and 114, respectively. Interfaces in the blue field, which includes all of the SAS stations, are always of the exit type.

Jumpers 120—120 (see FIG. 1) are used in administrative locations to interconnect interfaces in the same field or interfaces in different fields. Each jumper 120 includes two optical fibers. Configurations of jumpers 120—120 for cross-connections among four-fiber interfaces can be used to provide either an inverted connection or a direct connection (see FIG. 8). Referring to FIG. 8, it can be seen that if it is desired to cross-connect between two exit interfaces, it is necessary to connect the port 111 of one exit interface to the port 114 of another exit interface, port 112 to port 113, port 113 to port 112 and port 114 to port 111. For connecting two entry interfaces, it becomes necessary to connect the port 101 of one entry interface to the port 104 of the other interface, port 102 to port 103, port 103 to port 102 and port 104 to port 101. This is defined as an inverted connection. Similarly, in FIG. 8, to cross-connect between an exit and an entry interface, it is necessary to connect the port 111 of the exit interface to the port 101 of the entry interface, port 112 to port 102, port 113 to port 103 and port 114 to port 104. This configuration defines a direct connection.

It is important to understand that because a logical ring is being formed, each station must be connected between two neighbors. Cross-connections between distribution fields, and between distribution fields and blue-white station fields, are made in the same manner. Stations attached via a blue field are connected directly to M port sets 43—43 of a concentrator 42.

Figure 9:
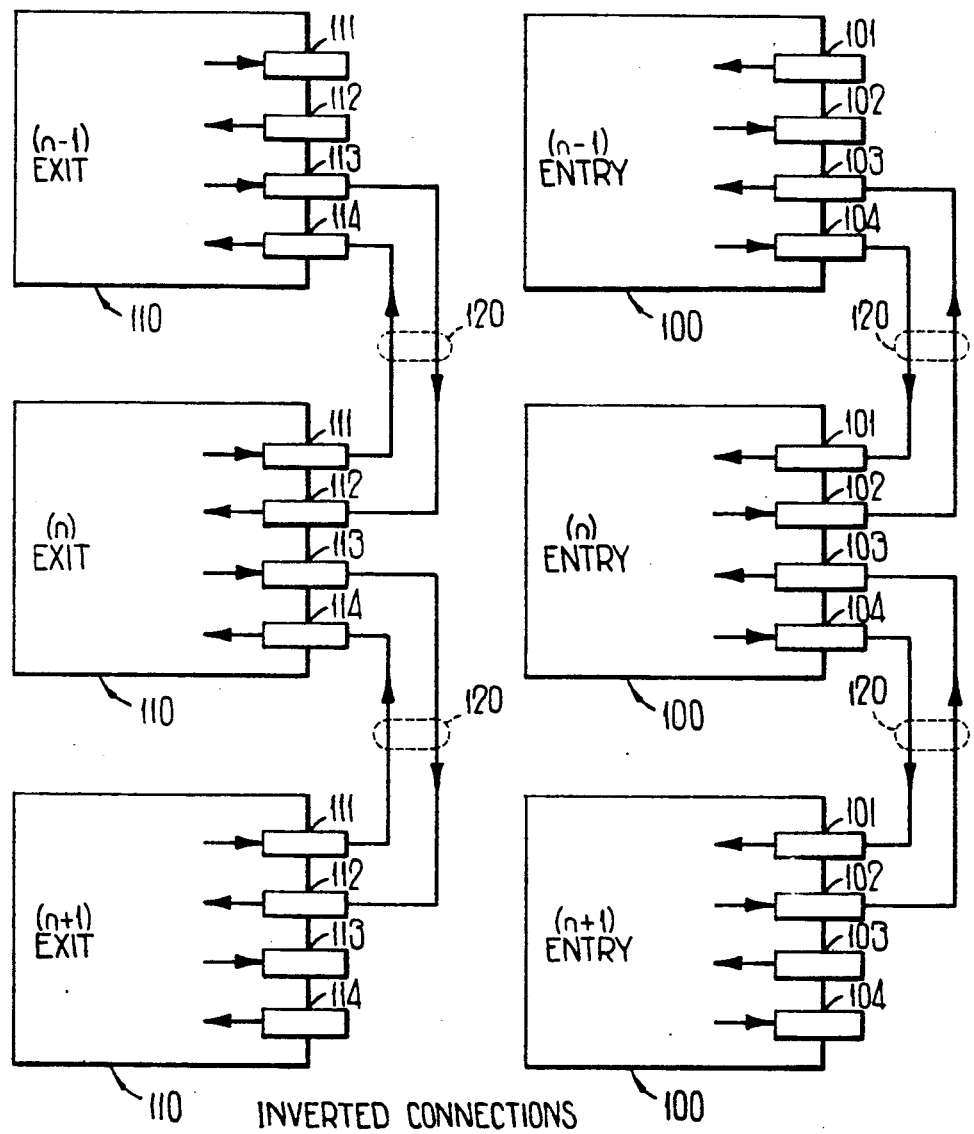
FIGS. 9 and 10 are schematic views which depict generalized inverted and direct connections between exit and entry interfaces.
Figure 10:
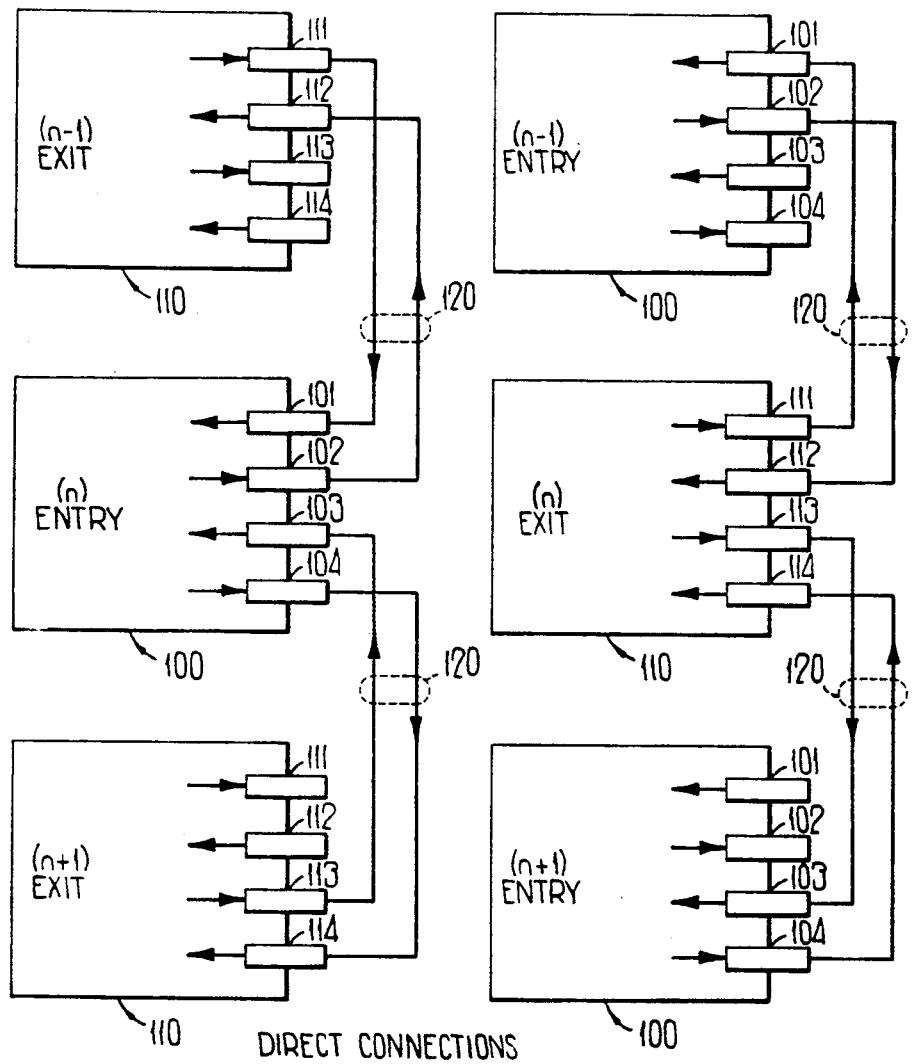

To define inverted and direct connections in a general sense, consider an interface, which is designated n (see FIG. 9). The upstream neighbor is designated n−1, and the downstream neighbor, n+1. To make an inverted connection, which is the most common, the first and second (blue and orange) fiber ports 111 and 112 of the n exit interface are jumpered to the fourth and third (brown and green) fiber ports 114 and 113, respectively, of the n−1 exit interface. Then the third and fourth (green and brown) fiber ports 113 and 114 of the n exit interface are jumpered to the second and first (orange and blue) fiber ports 112 and 111, respectively, of the n+1 interface. Inverted connections between entry interfaces are made in a similar manner as shown also in FIG. 9. To make a direct connection (see FIG. 10), fibers from ports 101 and 102 of an n entry interface are jumpered to fiber ports 111 and 112, respectively, of the n−1 exit interface. Then fibers from ports 103 and 104 of the n entry interface are jumpered to fiber ports 113 and 114 of the n+1 exit interface (see FIG. 10). Direct connections from an exit interface to two adjacent entry interfaces are made likewise as shown in FIG. 10. These two cross-connection arrangements are summarized in Table III. Again, the fiber port number shown in Table III corresponds to the last digit in the numeral used in this description to designate a fiber port.

TABLE III

Distribution System Cross-Connection Definitions

| Interface n − 1 | Interface n | Interface n + 1 |
|---|---|---|
| Inverted Connection | | |
| 4 (Brown) | 1 (Blue) | |
| 3 (Green) | 2 (Orange) | |
| | 3 (Green) | 2 (Orange) |
| | 4 (Brown) | 1 (Blue) |
| Direct Connection | | |
| 1 (Blue) | 1 (Blue) | |
| 2 (Orange) | 2 (Orange) | |
| | 3 (Green) | 3 (Green) |
| | 4 (Brown) | 4 (Brown) |

The definitions of the exit and entry four-fiber interfaces and the direct and inverted configurations allow simple guidelines for cross-connections to be established. For cross-connections between two exit interfaces, and between two entry interfaces, an inverted jumper configuration is always used. On the other hand, the connection of an exit interface to an entry interface includes a direct jumper arrangement. Having established the interface definition for each field at each administrative location, the selection of one of two possible cross-connection jumper configurations is specified (See Table IV). These standard interfaces and simple cross-connection rules allow the network to be engineered in a straightforward, logical manner.

TABLE IV

| Cross-Connection Configurations | | |
|---|---|---|
| Interface | Exit | Entry |
| Exit | Inverted | Direct |
| Entry | Direct | Inverted |

Cross-connections between white, brown and gray distribution fields, and between the distribution fields and a blue-white station field are made according to Table IV. For each FDDI station in a blue field, fibers in the first and second, and fibers in the third and fourth positions are considered to be transmit/receive pairs, which are each connected directly to an M port set of a concentrator.

Figure 11:
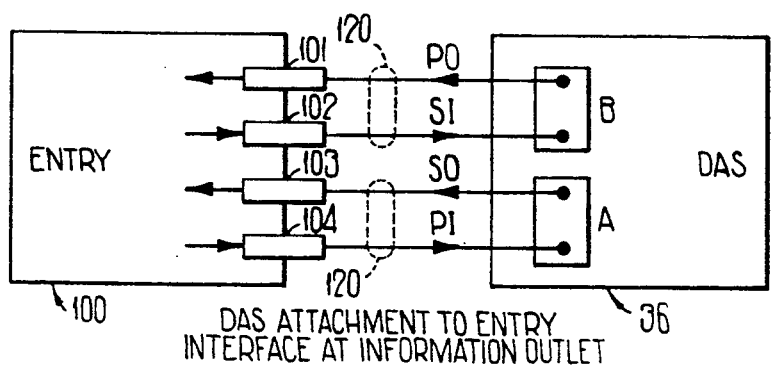
FIGS. 11 is a schematic view which depicts a station attachment to an entry interface.

As mentioned hereinbefore, the four-fiber interface for dual ring attachments at an information outlet at the end of a horizontal distribution run always has an entry sense. FIG. 11 depicts an arrangement of jumpers 120—120 for a connection of a dual attached station 36 to an entry interface 100, which could be disposed at an information outlet at the station, or in a closet or in an equipment room 53. The ring integrity is maintained by connecting the Primary Out/Secondary In fiber pair of the station port set B to fiber ports 101 and 102, respectively, of the interface 100. Likewise, the Secondary Out/Primary In fiber pair is jumpered to fiber ports 103 and 104. For an entry interface 100, the primary ring signal flows into the distribution system on the fiber port 101. Fiber ports 101 and 102 can be regarded as a duplex connection presenting an A interface set to the station. Fiber ports 103 and 104 present a B interface set to the station. If the interface has an exit sense, the station B connection pair is connected to ports 114 and 113, and the A pair connects to the fiber ports 112 and 111. Single ring attachments to a four-fiber entry interface would likewise be made as shown in FIG. 11. If the station A and B connection pairs are changed to concentrator output M pairs, the duplex jumpers would be connected to the same fiber pairs shown, which correspond to S port sets looking into the network.

In the system of this invention, exit and entry interfaces are used in the connection of one building to another. The ring topology to include other buildings in a campus network is illustrated in FIG. 4. An exit interface in a brown field is used to terminate an outside plant cable where a ring enters an equipment room in a building, whereas an entry interface in a white field is used to terminate a cable on which a ring departs from a building. Because the exit/entry interface is reversed between any two ends of a cable, the interface in the brown field is always exit. Jumpers 120—120 are used to propagate the ring through each administrative location.

Riser cables 51—51 are terminated in the equipment room in a white field. The connections between the exit interface of the brown field and entry interfaces in the white field which terminate riser cables in the equipment room in the destination building will be direct connections (see FIG. 12). In the equipment room 53, all cross-connections within the white field are inverted connections. Assuming no brown or blue-white fields are present, the ring is closed in the white field by connecting the first floor to the last building, and the last floor to the first building, using inverted connections.

The equipment room 53 also may include tie cables connecting to a satellite closet on the same floor. These cables are terminated in a gray field. This field is connected in the same manner as in the riser closet 51 where the gray field is connected between an interface in a white field which terminates an incoming riser cable from an equipment room and an interface in a blue-white field which terminates a cable extending to a station. If no blue-white field is present in the equipment room 53, the gray field is connected between a white field and a brown field.

The riser segment of the architecture includes individual cables run from a white field 81 of the main cross-connection in an equipment room 53 to a white field 83 in each riser closet 51 on each floor where FDDI stations are to be terminated. This brings the dual ring up to each floor. The riser segment, as defined in this document, includes the riser cabling and the single riser administrative location or closet on each floor. Riser closets 51—51 may contain cross-connections, electronic equipment, such as concentrators, and auxiliary power. A riser cable 58 is terminated in a riser closet in an exit interface in a white field. Hence, a craftsperson, viewing a white field in a riser closet, knows that it is an exit interface at one end of a riser cable that terminates in a white field in the equipment room 53.

A horizontal segment also is included in a riser closet 51. The horizontal segment includes individual cables 59—59 connecting satellite closets and/or stations to cross-connection fields in the riser closet. The cross-connection fields in which cables to satellite closets 57—57 or stations terminate in the riser closet are neighbors of the exit interface in the white field which terminates a riser cable 58 from the equipment room. Cable that extends the dual ring to satellite closets 57—57 is terminated in an exit interface in a gray field in a riser closet 51. Connections within a riser closet are of the inverted type. All stations may be located in or attached to a single riser closet 51 on each floor, or one or more satellite closets 57—57 may be part of the design. A gray field in the riser closet 51 will have to be large enough to accommodate all the satellite closets on the floor. If all stations connect into a riser closet 51 with no satellite closet 57, there would not be any gray field in the riser closet because that color is reserved to terminate in a satellite closet.

A cable that connects a satellite closet 57 to a riser closet 57 is terminated in a gray field which is the only distribution field in a satellite closet. In the satellite closet 57, this field will always have an entry interface 100. The neighbors of this field, which are to be used when making cross-connections, are a first exit interface in a blue-white field, and a last exit interface in a blue-white field. Cross-connections to the entry interface in the gray field will always be of the direct type; cross-connections within the blue-white field are inverted.

As mentioned earlier herein, there are two types of stations included in the network architecture of this invention. Fields associated with both of these stations always will have exit interfaces 110—110. Stations 36—36 that are connected directly to the main FDDI rings are terminated in exit interfaces in a blue-white field, and stations that connect to concentrators 42—42 are terminated in blue fields.

The final connections that must be considered are those from a blue field to M port sets of concentrators 42—42. For every FDDI station in a blue field, the first and second, and the third and fourth fiber ports can be considered transmit/receive pairs (T/R). To connect FDDI stations in the blue field to M port sets of concentrators, each fiber of each T/R pair is connected to one of the M ports sets of the concentrators. When connecting single attached stations in the blue field, it does not matter which connection pair is used. If dual attached stations are to be connected, the customer may wish to connect one T/R pair to one concentrator and the other T/R pair to another concentrator to take advantage of the dual homing feature provided in the FDDI standard. It is expected that if stations that are to be attached through a concentrator are disposed in a closet, they will be jumpered directly.

In general, one information outlet, terminating one four fiber cable will be required at every station for an FDDI topology. The optical connection between a dual attached station and an information outlet should be made with fiber jumpers. The standard attachment of a dual attached station to an information outlet is shown in FIG. 11. It should be observed that according to the definitions in Table I and FIG. 6, the information outlet will always be designated as an entry interface.

What is important is that once the interfaces have been defined as in Table II, a craftsperson is able to enter an administrative location and, in accordance with a simplistic set of rules, install jumpers. For example, a craftsperson may enter a riser closet and view interfaces in white and gray fields. If it is desired to connect a gray field associated with a satellite closet to a white field associated with the riser closet in order to propagate the ring through the riser closet to the satellite closet, the craftsperson causes an inverted jumper arrangement to be made between the existing interfaces and will thus have made the connection necessary to carry the ring out to a satellite station.

In order to illustrate the connection guidelines of this invention, several examples are provided. For example, consider an equipment room in a Building B where the dual ring is brought in from another building, Building A, of a campus network on a campus cable 74. The cable 74 is terminated in Building B in a brown field with an exit interface 131 (see FIG. 12).

Figure 12:
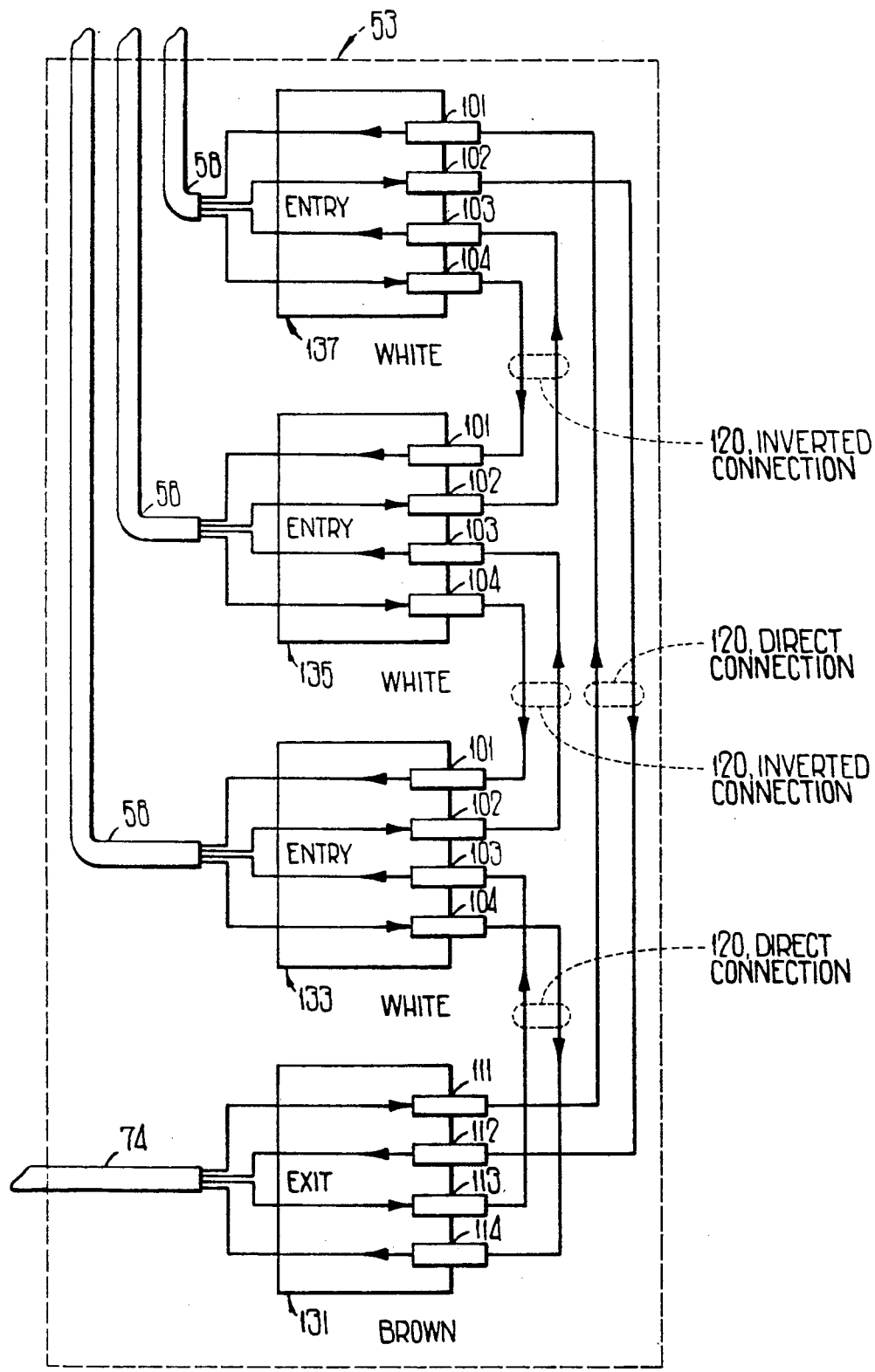
FIG. 12 is a schematic view of an example of jumpered connections among interfaces in an administrative location in an equipment room.

It is supposed that it is desired to propagate the dual rings to three floors of Building B. Riser cables each are terminated in a white field of the equipment room, which includes three entry interfaces 133, 135 and 137. As shown in FIG. 12, for a propagation of the primary ring, the jumpers 120—120 can be connected in the following sequence. The exit interface 131 which terminates the campus cable 74 in Building B is connected to the entry interface 137 in a white field associated with the third floor using a direct connection. The third floor entry interface 137 then is connected to the second floor entry interface 135 using an inverted connection. Next, the second floor entry interface 135 is connected to the first floor entry interface 133 using an inverted connection. The rings are closed by connecting the first floor entry interface to the exit interface 131 which terminates the campus cable, using a direct connection.

Figure 13:
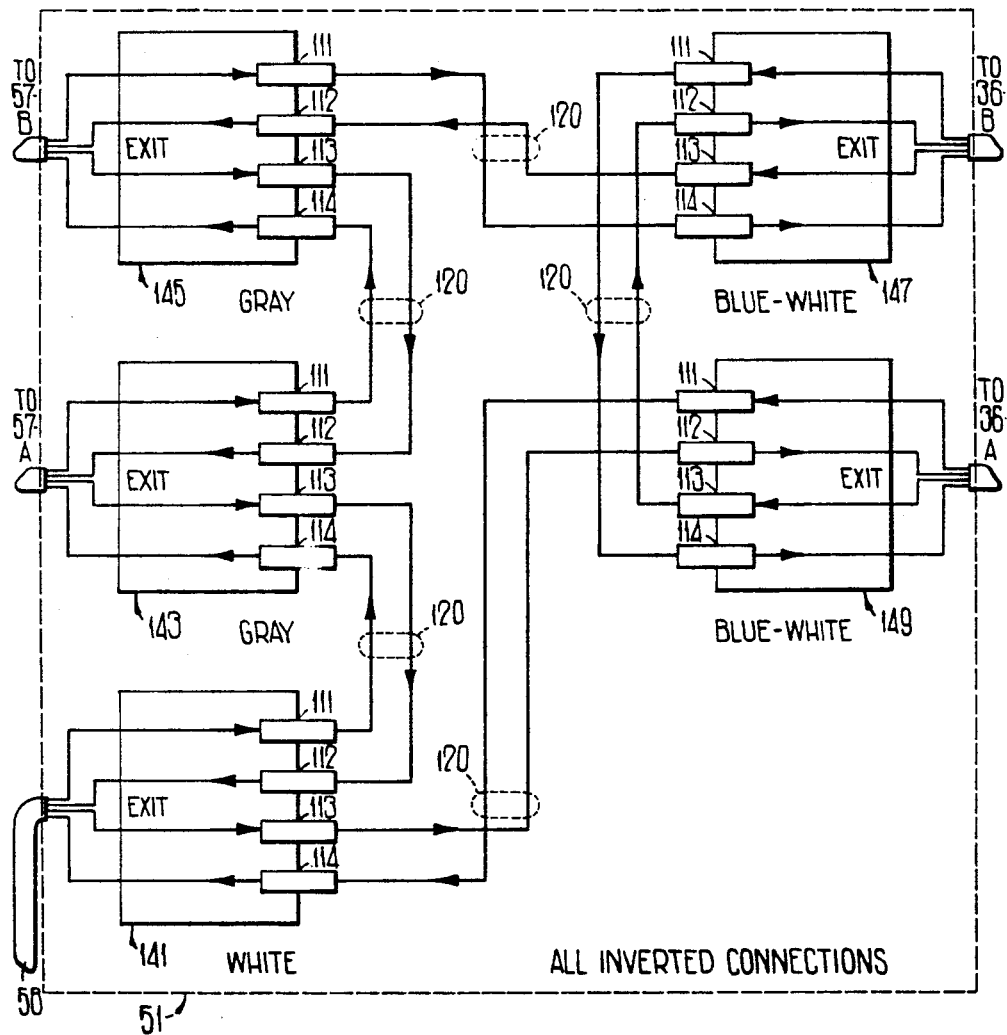
FIG. 13 is a schematic view of an example of an administrative location in a riser closet showing jumper connections among exit interfaces therein.

For a riser closet, consider an example wherein interfaces in the gray field associated with two satellite closets and interfaces in the blue-white field associated with two dual attached stations are cross-connected to a white field associated with a riser cable in a dual ring architecture (see FIG. 13). Because from Table II it is known that the sense of all interfaces in the riser closet is exit, all jumpers are of the inverted configuration. For the construction of the primary ring, the closet jumpers can be placed in the following sequence. An exit interface 141 which terminates a riser cable 58 is connected to an exit interface 143 of a gray field which is associated with a satellite closet 57-A using an inverted duplex jumper connection. The exit interface 143 which is associated with the satellite closet 57-A is connected to an exit interface 145 in a gray field which is associated with a satellite closet 57-B using an inverted connection. Then, the exit interface 145 which is associated with the satellite closet 57-B is connected to an exit interface 147 in a blue white field associated with a dual attached station 36-B using an inverted connection. As is seen in FIG. 13, the exit interface 147 associated with the dual attached station 36-B is connected to an exit interface 149 in a blue-white field associated with a dual attached station 36-A using an inverted connection. The ring is closed by connecting the interface 149 associated with the dual attached station 36-A to the exit interface 141 in the white field in the riser closet 51, using an inverted connection.

Figure 14:
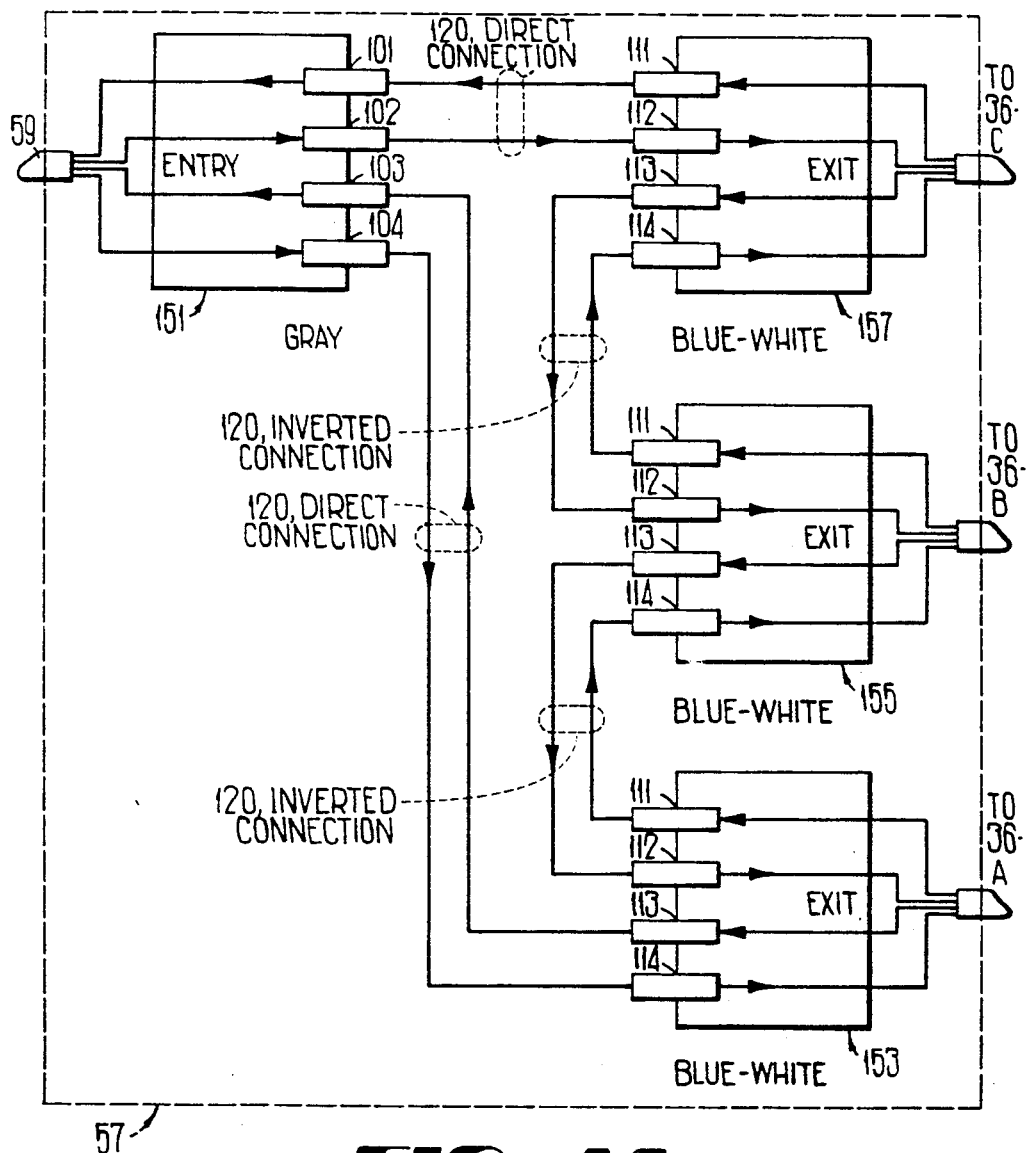
FIG. 14 is a schematic view of an example of jumpered connections within a satellite closet.

For another example, FIG. 14 is used to illustrate guidelines for cross-connections in a satellite closet. FIG. 14 shows a satellite closet 57 for three station attachments. The sequence of jumper attachments is as follows. An entry interface 151 in a gray field terminating a cable extending from a riser closet is connected to an exit interface 153 in a blue-white field associated with a first dual attached station 36A using direct connections. The exit interface 153 in the blue-white field associated with the first station 36A is connected to an exit interface 155 in the blue-white field associated with a second station 36B, using an inverted jumper configuration. In the blue-white field, the second station 36B is connected to an exit interface 157 associated with a third station 36C, using an inverted jumper configuration. The ring is closed through the gray field by connecting the exit interface 157 in the blue-white field associated with dual attached station 36C to the entry interface 151, using a direct jumper configuration.

It is understood that the above-described arrangements are simply illustrative of the invention. Other arrangements may be devised by those skilled in the art which will embody the principles of the invention and fall within the spirit and scope thereof.

We claim:

1. An optical ring network topology, which comprises:
   at least two stations;
   an administrative location;
   an optical path which extends from said administrative location to a first one of said stations and which returns from said first one of said stations to said administrative location;
   an optical path which extends from said administrative location to a second one of said stations and which returns from the second one of said stations to said administrative location;
   a plurality of interface means disposed at said administrative location for terminating said optical path to said first one of said stations and for terminating said optical path to the second one of said stations, each said interface means having at least two ports each port adapted to have an optical signal pass therethrough and being capable of having the direction of a signal through each port thereof changed; and
   jumper means disposed at said administrative location and capable of interconnecting selected portions of said interface means for providing a ring by completing said optical path from said first one of said stations through ones of said interface means at said administrative location to the second one of said stations, said plurality of interface means being such that said stations may be connected by said jumper means in different optical paths through said plurality of interface means.

2. The ring network topology of claim 1, wherein each said interface means which terminates an optical path includes a set of two ports with the optical path which extends and returns from the first one of said stations being connected to ports of one of said plurality of interface means and with the optical path which extends and returns from the second one of said stations being connected to ports of another interface means.

3. The network topology of claim 2, wherein a first port of the set of ports of one interface means may be connected to a first port of the set of ports of the other interface means.

4. A dual ring optical network topology, which comprises:
   at least two stations, each of which is capable of receiving and transmitting signals;
   an administrative location;
   a first optical path which extends in one ring direction from said administrative location to a first one of said stations and from said first one of said stations back to said administrative location and which extends from said administrative location to a second one of said stations and from the second one of said stations back to said administrative location;

a second optical path which extends in an opposite ring direction from said administrative location to said first one of said stations and from said first one of said stations back to said administrative location and which extends in an opposite ring direction from said administrative location to the second one of said stations and from the second one of said stations back to said administrative location; and a plurality of interface means disposed at said administrative location for terminating portions of said first optical path, and for terminating portions of said second optical path, each said interface means having at least two signal ports and being capable of having the direction of a signal through each port thereof changed; and jumper means disposed in said administrative location for providing a first ring by completing said first optical path through ones of said interface means at said administrative location and for providing a second ring by completing said second optical path through ones of said interface means at said administrative location.

5. The dual ring network topology of claim 4, wherein said interface means includes first and second interfaces wherein each said interface comprises four ports with one port of a first set of two ports and with one port of a second set of two ports being associated with said first optical path and with the other port of said first set of ports and with the other port of the second set of ports being associated with said second optical path.

6. The dual ring network topology of claim 5, where one of said ports of each set is an input port and the other port of each set is an output port.

7. The network topology of claim 6, wherein each said interface is assigned to a colored field as a function of its location within said network topology and of the location of an interface means which terminates an opposite end of the portion of the optical path which it terminates.

8. The network topology of claim 7, wherein first and second ports of the first set of ports of a first interface may be connected to a first and second ports of the first set of ports of a second interface.

9. The network topology of claim 8 wherein first and second ports of the second set of ports of the second interface is connected to the first and second ports of the second set of ports of still another interface.

10. The network topology of claim 7 wherein first and second ports of one set of ports of an interface may be connected to second and first ports of the other set of ports, respectively, of another interface.

11. The network architecture of claim 4, wherein said interface means includes an exit interface and an entry interface, each said interface including first and second sets of two ports each, a first port of said first set and a second port of said second set comprising output and input ports of a primary ring of said dual ring topology and the second port of said first set and the first port of said second set comprising input and output ports of a secondary ring of said dual ring topology.

12. A network architecture characterized by a logical ring topology for providing optical signals to η stations where η is an integer having a value of at least two, said network architecture including:

η stations, each of said stations being capable of transmitting and receiving optical signals;

a first interface which is associated with one of said stations and which includes at least one set of two connection ports, one of the ports of said at least one set being an output transmitting port and the other one of the ports of said at least one set being an input receiving port;

at least one second interface each of which is associated with one of said stations and each of which includes at least one set of two connection ports, one of the ports of said at least one set of each said second interface being an output transmitting port and the other one of the ports of said at least one set of each said second interface being an input receiving port;

means for connecting said first interface to one of said stations and for connecting each of said second interfaces to an associated station; and jumper means for connecting said first and second interfaces to cause each of said stations and each of said interfaces to be disposed in a ring topology.

13. The network architecture of claim 12, which includes a plurality of second interfaces wherein said jumper means connects an output port of said first interface to an input port of a first one of said second interfaces, connects an output port of said first one of said second interfaces to an input port of a second one of said second interfaces and thereafter connects an output port of each successive one of said second interfaces to an input port of the next successive second interface and said jumper means causes an output port of a last successive one of said second interfaces to be connected to an input port of said first interface.

14. A network architecture for providing optical signals to at least one station in a dual ring, counter rotating optical topology, said network architecture comprising:

a source of optical signals;

a plurality of stations each of which is capable of receiving and transmitting signals;

an administrative location, which includes:

a first interface which is connected to said source of optical signals and which includes two sets of connection ports, each set of said ports including an output transmitting port, and the other one of the ports of each set being an input receiving port;

a plurality of second interfaces each of which is associated with a station and each of which includes first and second sets of connection ports, each set including two ports with one of the ports of each said set of said second interface being an output transmitting port and the other one of the ports of each said set of ports of each said second interface being an input receiving port; and jumper means for connecting input and output ports of one set of ports of said first interface to input and output ports of one set of ports of a first one of said second interfaces and for connecting any successive second interface through primary and secondary rings of said dual ring which include said first interface and said first one of said second interfaces with means connecting input and output ports of the other set of ports of a last successive one of said second interfaces to input and output ports of the other set of ports of said first interface; and optical media means for connecting input and output ports of each set of ports of each said second interface to a station and for connecting input and output ports of said first interface to said source of optical signals.

15. The network architecture of claim 14, wherein an input port of one of the sets of each said second interface and an output port of the other one of the sets of each said second interface being adapted to be connected to a primary ring and with an output port of said one of the sets of said second interface and an input port of the other one of the sets of said second interface being adapted to be connected to a secondary ring.

16. The network architecture of claim 15, wherein at least one of said second interfaces includes an entry interface and wherein an entry interface comprises four ports comprising first and second sets of ports, each set of ports including an input and an output port with a first port of said first set being an input port.

17. The network architecture of claim 16, wherein at least one of said second interfaces includes an exit interface and wherein an exit interface comprises first and second sets of ports, each set of ports including an input and an output port with a first port of said first set being an output port.

18. The network architecture of claim 17, wherein an inverted connection is made between two exit or between two entry interfaces in which input and output ports of corresponding rings of different sets are connected by jumpers.

19. The network architecture of claim 18, wherein a direct connection is made between an exit and an entry interface in which input and output ports of corresponding sets are connected by jumpers.

20. The network architecture of claim 19, wherein said first interface is an exit interface which comprises first and second sets of ports, each set of ports including an input and an output port with a first port of said first set being an output port and wherein each of said second interfaces is an entry interface which comprises four ports comprising first and second sets of ports, each set of ports including an input and an output port with a first port of said first set being an input port, wherein said first interface is connected to first and last ones of said second interfaces with direct connections and wherein each second interface is connected to a next successive second interface with an inverted connection.

21. The network architecture of claim 19, wherein said administrative location is a first administrative location, and wherein said network architecture also includes a second administrative location in which is disposed a first interface which is connected by said media means to a source of optical signals in said first administrative location and a plurality of second interfaces, each of said first and second interfaces in said second administrative location having two sets of ports each set having an input and output port, each of said interfaces in said second administrative location being an exit interface with said interfaces being interconnected in a dual ring with inverted connections.

22. The network architecture of claim 21, wherein said second administrative location also includes at least one exit interface associated with a station, said at least one exit interface associated with a station being connected in an inverted manner with a last one of said second interfaces and with said first interface.

23. The network architecture of claim 22, wherein said second administrative location includes a plurality of exit interfaces which are connected in an inverted manner and each of which is associated with a station.

24. The network architecture of claim 21, which also includes a third administrative location in which is disposed a first interface which is connected to a source of optical signals in said second administrative location and a plurality of second interfaces, said first interface in said third administrative location being an entry interface and said second interfaces in said third administrative location being exit interfaces, with jumpers being used to provide direct connections between said first interface and first and last ones of said second interfaces in said third administrative location and with inverted connections between each two successive second interfaces in said third administrative location.

25. The network architecture of claim 15, wherein duplex jumpers are used to connect fiber ports and wherein a jumper includes two optical fibers, each jumper adapted to be connected to first and second ports of the first set or to first and second ports of the second set.

26. The network architecture of claim 25, wherein a jumper comprising a pair of optical fibers is used to connect first and the second ports of a first set of said first interface to first and second ports of the first set of a last one of the second interfaces, wherein a jumper is used to connect first and second ports of a second set of said first interface to first and second ports of the second set of a first one of said second interfaces, and wherein adjacent ones of said second interfaces are connected by a jumper which extends from first and second ports of the first set of one of said second interfaces to second and first ports, respectively, of the second set of ports of a next successive one of said second interfaces.

27. A network architecture for providing optical signals to $\eta$ stations in a dual ring, counter rotating topology said network architecture comprising:

a source of optical signals;

at least two stations each of which is capable of transmitting and receiving optical signals;

an administrative location, which includes:

a first interface which is connected to said source of optical signals and which includes first and second sets of connection ports, each set of said ports comprising two ports including an output transmitting port, and the other one of the ports of each set being an input receiving port, with one port of each set being associated with a primary ring and with the other port of each set being associated with a secondary ring;

a plurality of second interfaces each of which is associated with at least one station and each of which includes first and second sets of connection ports, each set of ports including two ports with one of the ports of each said set of said second interface being an output transmitting port and the other one of the ports of each said set of ports of each said second interface being an input receiving port, one port of each set of each said second interface being associated with a primary ring and the other ports of the sets being associated with a secondary ring; and jumper means for connecting said first and second interfaces, said jumper means including jumpers extending from an output port of the first set of ports of said first interface to the input port of the first set of ports of a first one of said second interfaces, from the output port of the second set of ports of said first second interface to an input port of the first set of a next successive second interface and from an output port of the second set of said next successive second interface to an input port of the first set of ports of a next successive second interface and through any next successive second interface to a last successive second interface with a jumper connecting an output port of the second set of the last successive second interface to an input port of the second set of ports of said first interface, said jumper means also including jumpers extending from the output port of the second set of ports of said first interface to an input port of the second set of ports of said last successive second interface and from the output port of the first set of ports of the last successive second interface to the input port of the second set of ports of the next to last successive second interface and through any other second interface with a jumper extending to the input port of the second set of ports of said first one of said second interfaces and from the output port of said first set of ports of the first one of the second interfaces to an input port of the first set of ports of said first interface; and means for connecting an input port of the first set of ports of each said second interface and an output port of the second set of ports of each said second interface to a station, for connecting an output port of the first set of ports and an input port of the second set of ports of each said second interface to a station and for connecting output and input ports of said first interface to said source of optical signals.

28. The network architecture of claim 27, wherein said administrative location is a first administrative location and said architecture further includes:

a second administrative location which includes:

a first interface which is connected to a source of optical signals and which includes first and second sets of connection ports with each set comprising two ports and including an output transmitting port and an input receiving port, one port of each set of said first interface of said second administrative location being associated with the primary ring and the other port of each set of said first interface of said second administrative location being associated with the secondary ring;

a plurality of second interfaces each of which includes first and second sets of two connection ports each, one of the ports of each said set of each said second interface in said second administrative location being an output transmitting port and the other being an input receiving port, one port of each set of each said second interface in said second administrative location being associated with the primary ring and the other port of each set being of each said second interface in said second administrative location associated with the secondary ring; and jumper means for connecting said first and second interfaces in said second administrative location, said jumper means including jumpers from the output port of the first set of the first interface in said second administrative location to an input port of the second set of a first one of said second interfaces in said second administrative location, from the output port of the first set of said first one of said second interfaces in said second administrative location to an input port of the second set of another one of said second interfaces in said second administrative location and from an output port of the first set of the other one of said second interfaces in said second administrative location to the input port of the second set of ports of any next successive second interface in said second administrative location and means connecting from an output port of the first set of ports of a last successive second interface in said second administrative location to the input port of the second set of ports of said first interface in said second administrative location, said jumper means further including means connecting from the output port of the second set of ports of said first interface in said second administrative location to the input port of the first set of ports of said last successive one of said second interfaces in said second administrative location and jumpers from an output port of the second set of ports of said last successive second interface in said second administrative location to the input port of the first set of ports of the previous successive second interface in said second administrative location and on from the output port of the second set of ports of said first one of the plurality of second interfaces in said second administrative location to the input port of the first set of ports of said first interface in said second administrative location; and media means for connecting input and output ports of the first and second set of ports of said first interface in said second administrative location to output and input ports of first and second sets of ports of one of said second interfaces of said first administrative location.

29. The network architecture of claim 27, which includes an exit interface and an entry interface, each said interface including first and second sets of ports, each set including first and second ports, the first port of said first set and the second port of said second set comprising output and input ports, respectively, of a primary ring of said dual ring topology and the second port of said first set and the first port of said second set comprising input and output ports, respectively, of a secondary ring of said dual ring topology.

30. The network architecture of claim 29, wherein the first port of said first set and the first port of said second set of ports of an exit interface comprise output ports, respectively, of said primary and said secondary rings, respectively.

31. The network architecture of claim 30, wherein said second port of said first set and said second port of said second set of ports of an exit interface comprises input ports, respectively, of said secondary and said primary rings, respectively.

32. The network architecture of claim 31, wherein the first port of said first set and the first port of said second set of ports of an entry interface comprise input ports, respectively, of said primary and secondary rings, respectively.

33. The network architecture of claim 32, wherein said second port of said first set and said second port of said second set of ports of an entry interface comprises output ports, respectively, of said secondary and said primary rings, respectively.

34. The network architecture of claim 33, which includes direct connections wherein a direct connection is a connection between an exit interface and an entry interface with jumpers extending between an output port of one set of one interface to an input port of a corresponding set of the same ring of the other interface.

35. The network architecture of claim 33, which includes inverted connections between two entry interfaces, or between two exit interfaces, wherein an inverted connection includes jumpers extending from an output port of one set of one interface to an input port of the same ring of the other set of the other interface.

36. The network architecture of claim 35, wherein each said interface is located in a color coded field.

37. The network architecture of claim 36, said network architecture being used to provide service to a plurality of stations within one buliding which includes an equipment room, at least one service closet and the plurality of stations and wherein said interfaces are disposed in said equipment room, in said at least one service closet and at each of said stations, and wherein media means carries a source of optical signals said one building and terminates in an exit interface in a brown field.

38. The network architecture of claim 37, wherein said equipment room is provided with at least one entry interface in a white field which is connected to said exit interface in a brown field with direct connections.

39. The network architecture of claim 37, which also includes at least one satellite closet such that said at least one service closet is a riser closet with the dural ring extending from said equipment room to said riser closet to said satellite closet and to said stations and back to said equipment room, wherein connections between interfaces in each closet and in said equipment room are made with jumper means.

40. The network architecture of claim 39, wherein an equipment room is provided with a plurality of entry interfaces in a white field each of which is connected to an exit interface in a white field in one of a plurality of riser closets, the exit interface in a white field in each riser closet being connected in a dual ring manner with inverted connections to at least one exit interface in a gray field which is connected by media means to an entry interface in a gray field in a satellite closet or to an interface at a station.

41. The network architecture of claim 40, which also includes another building having an equipment room in which are disposed an entry interface in a white field which is connected by said media means to said exit interface in a brown field of said equipment room of said one building and an entry interface in a white field which is connected in a dual ring in the other building to at least one riser 6 closet.

42. The network architecture of claim 40, which also includes interfaces in a blue-white field for connecting dual attached stations to the primary ring and to the secondary ring.

43. The network architecture of claim 42, wherein a riser closet includes an exit interface in a white field which is connected to an entry interface in a white field in an associated equipment room and is connected with inverted connections to at least one exit interface in a gray field in said riser closet, each said exit interface in a gray field in said riser closet being connected by media means to an entry interface in a gray field in a satellite closet which is associated with said riser closet.

44. The network architecture of claim 43, wherein said network further includes at least one blue-white dual ring station interface in a riser closet with a first port of said first set of ports of a last successive exit interface in a gray field in said riser closet being connected to the second port of the second set of ports of a first exit interface in a blue-white in said riser closet and with the first port of the first set of ports of a last successive exit interface unit in the blue-white field in said riser closet being connected to the second port of the second set of ports of said exit interface in the white field in said riser closet, said first port of said second set of ports of said exit interface in the white field in said riser closet being connected to the second port of the first set of ports of said last successive blue-white interface in said riser closet and from the first port of the second set of ports of the first exit interface in the blue-white field in said riser closet to the second port of the first set of the last successive exit interface in the gray field in said riser closet, from the first port of the second set of the last successive exit interface in the gray field in said riser closet through to the second port of the first set of the first exit interface in the gray field in said riser closet and from the first port of the second set of ports of the first exit interface in the gray field in said riser closet to the second port of the first set of said exit interface in the white field in the riser closet, said first and second ports of the first set of each exit interface in the blue-white field in said riser closet being connected respectively to the second and first ports of the second set of ports of a next successive exit interface, if any, in the blue-white field in said riser closet.

45. The network architecture of claim 44, wherein said satellite closet includes an entry interface in a gray field and at least one exit interface in a blue-white field, said media connections being made from an exit interface in a gray field in an associated riser closet to said entry interface in said gray field in said satellite closet, said entry interface in said gray field in said satellite closet being connected to a first and a last one of said interfaces in the blue-white field in said satellite closet by jumpers in a direct connection arrangement, the connections between each two successive interfaces in the blue-white field in said satellite closet being inverted.

46. The network architecture of claim 45, wherein said exit interface in the white field in said riser closet is connected in a dual ring to the first one of said exit interfaces in the gray field in said riser closet with jumpers in an inverted connection arrangement with a last successive one of said exit interfaces in the gray field and said exit interface in the white field in said riser closet being connected in a dual ring to at least one exit interface in the blue-white field in said riser closet in an inverted connection arrangement, the connections within the gray and within the blue-white fields in said riser closet being inverted.

47. The network architecture of claim 45, wherein an equipment room closet includes an exit interface in a brown field and a plurality of entry interfaces in a white field, each entry interface in said equipment room closet being associated with a floor of said building, said interfaces in the brown and white fields in said equipment room closet being included in a ring which includes at least a riser closet on each floor, the connections between said exit interface in the brown field and a first and last one of said entry interfaces in the white field in said equipment room closet being a direct connection arrangement whereas the connections between said entry interfaces in the white field in said equipment room closet are inverted connection arrangements.

48. A method of connecting data transmitting and receiving stations in a ring network topology, said method comprising the steps of:

providing at least two stations;

providing at least one administrative location;

establishing an optical path which extends from each said administrative location to a first one of said stations and which returns from said first one of said stations to said each administrative location;

establishing an optical path which extends from each said administrative location to a second one of said stations and which returns from the second one of said stations to said each administrative location;

terminating said optical path to said first one of said stations and terminating said optical path to the second one of said stations; and completing an optical ring along the optical paths through each said administrative location.

49. A method of connecting data transmitting and receiving stations in a dual ring optical network topology, said method comprising the steps of:

providing at least two stations;

providing an administrative location;

establishing a first optical path which extends in one ring direction from an administrative location to a first one of the stations and back to the administrative location and which extends from the administrative location to a second one of the stations and returns to the administrative location;

establishing a second optical path which extends in the opposite ring direction from the administrative location to the first one of said stations and returns and which extends from the administrative location in the opposite ring direction to the second one of said stations and returns to the administrative location;

terminating the first optical ring path and terminating the second optical ring path at each administrative location and at each station with an interface; and completing a first optical ring along the first optical path through the administrative location and completing a second optical ring along the second optical path through the administrative location.

50. A method of connecting data transmitting and receiving stations in a dual ring optical topology, said method including the steps of:

providing a plurality of stations which are capable of transmitting and receiving optical signals on a plurality of floors of a building;

causing an administrative location to be disposed on each floor which includes a station;

providing a first optical path which extends in one ring direction from the one administrative location on each floor to each station on that floor and back to the administrative location on that floor;

providing a second optical path which extends in the-opposite ring direction from the one administrative location on each floor to each station on that floor and back to the administrative location on that floor;

causing a portion of the first optical path and of the second optical path to extend between the administrative locations; and cross-connecting the first optical path through each administrative location to complete a first optical ring and establish a primary ring therealong and for cross-connecting the second optical path through each administrative location to complete a second optical ring and establish a secondary ring therealong.

* * * * *